(12) United States Patent
Liu et al.

(10) Patent No.: US 9,132,710 B2
(45) Date of Patent: Sep. 15, 2015

(54) DAMPING FORCE CONTROL DEVICE FOR VEHICLE

(71) Applicant: TOYOTA JIDOSHA KABUSHIKI KAISHA, Toyota-shi (JP)

(72) Inventors: Yanqing Liu, Susono (JP); Yuichi Mizuta, Sunto-gun (JP); Motohiko Honma, Toyota (JP); Jin Hozumi, Sunto-gun (JP); Masaaki Tabata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/248,675

(22) Filed: Apr. 9, 2014

(65) Prior Publication Data
US 2014/0214274 A1    Jul. 31, 2014

Related U.S. Application Data

(62) Division of application No. 13/579,461, filed as application No. PCT/JP2010/052803 on Feb. 17, 2010, now Pat. No. 8,744,681.

(51) Int. Cl.
*B60G 17/015* (2006.01)
*B60G 17/08* (2006.01)

(52) U.S. Cl.
CPC .............. *B60G 17/015* (2013.01); *B60G 17/08* (2013.01); *B60G 2400/102* (2013.01);
(Continued)

(58) Field of Classification Search
CPC ............... B60G 17/015; B60G 17/08; B60G 2400/204; B60G 2400/102; B60G 2400/106; B60G 2400/25; B60G 2400/104; B60G 2800/012; B60G 2800/014; B60G 2800/912; B60G 2500/10; B60G 2800/01
USPC .......................................................... 701/38
See application file for complete search history.

(56) References Cited

U.S. PATENT DOCUMENTS

| 5,944,763 A * | 8/1999 | Iwasaki .......................... 701/37 |
| 2006/0047387 A1 | 3/2006 | Izawa et al. |
| 2008/0234896 A1 | 9/2008 | Kato et al. |

FOREIGN PATENT DOCUMENTS

| JP | 6 219130 | 8/1994 |
| JP | 2006 44523 | 2/2006 |

(Continued)

OTHER PUBLICATIONS

International Search Report Issued Apr. 27, 2010 in PCT/JP10/052803 Filed Feb. 17, 2010.

*Primary Examiner* — Mary Cheung
*Assistant Examiner* — Anne Mazzara
(74) *Attorney, Agent, or Firm* — Oblon, McClelland, Maier & Neustadt, L.L.P.

(57) ABSTRACT

Disclosed is a damping force control device for a vehicle that controls the damping coefficient of a damping force generation device on the basis of a final target control amount that is based on the target control amount for attitude control, which suppresses changes in the vehicle body attitude in at least the rolling direction, and the target control amount for riding comfort control, which increases riding comfort with regards to vehicle body vibrations in at least the rolling direction. The target control amount for riding comfort control is a control amount calculated as the total of a fixed basic control amount and a variable control amount. The target control amount and the variable control amount for attitude control are calculated, a post-correction basic control amount, which is nearer to the target control amount for attitude control than the basic control amount, is calculated, and the total of the post-correction basic control amount and the variable control amount is set as the final target control amount, thereby excellently achieving both the suppression of attitude changes and an increase in riding comfort.

4 Claims, 7 Drawing Sheets

(52) U.S. Cl.
CPC .... *B60G 2400/104* (2013.01); *B60G 2400/106* (2013.01); *B60G 2400/204* (2013.01); *B60G 2400/25* (2013.01); *B60G 2500/10* (2013.01); *B60G 2800/01* (2013.01); *B60G 2800/012* (2013.01); *B60G 2800/014* (2013.01); *B60G 2800/912* (2013.01)

(56) References Cited

FOREIGN PATENT DOCUMENTS

| | | |
|---|---|---|
| JP | 2006 160185 | 6/2006 |
| JP | 2008-238922 A | 10/2008 |
| WO | WO 2009/139451 A1 | 11/2009 |

\* cited by examiner

DAMPING FORCE CONTROL DEVICE FOR VEHICLE

CROSS-REFERENCE TO RELATED APPLICATIONS

This application is a divisional of U.S. Ser. No. 13/579,461 filed Aug. 16, 2012, the entire contents of which is incorporated herein by reference, which is the national stage of PCT/JP10/052803, filed Feb. 17, 2010.

TECHNICAL FIELD

The present invention relates to a damping force control device for a vehicle and, more particularly, to a damping force control device which controls damping coefficient of a damping force generation device installed corresponding to each vehicle wheel.

BACKGROUND ART

There have been proposed various damping force control devices which control damping coefficient of a damping force generation device installed corresponding to each vehicle wheel. For example, there has already been known a damping force control device which controls a damping coefficient of each damping force generation device based on a target control amount for suppressing changes in a vehicle body attitude and a target control amount for increasing riding comfort of a vehicle (see Japanese Patent Laid-Open Publication No. 2006-44523).

In the case where a damping coefficient of each damping force generation device is controlled based on the total of a target control amount for attitude control and a target control amount for riding comfort control, a requirement of control amount may become too large, which may rather deteriorate riding comfort of a vehicle. On the other hand, in the case where a damping coefficient of each damping force generation device is controlled based on the higher one of a target control amount for attitude control and a target control amount for riding comfort control, it may be difficult to effectively enhance riding comfort of a vehicle.

DISCLOSURE OF THE INVENTION

A primary object of the present invention is to preferably achieve both suppression of changes in a vehicle body attitude and increasing of riding comfort of a vehicle in accordance with a target control amount for attitude control and a target control amount for riding comfort control.

The present invention provides a damping force control device for a vehicle which calculates a final target control amount that is based on a first target control amount for suppressing changes in the vehicle body attitude in at least the rolling direction, and a second target control amount for increasing riding comfort with regards to vehicle body vibrations in at least the rolling direction, for each damping force generation device installed between a vehicle wheel and a vehicle body, and controls the damping coefficient of each damping force generation device in accordance with the final target control amount, wherein the second target control amount is a control amount which is to be calculated as the total of a fixed basic control amount and a variable control amount; the first target control amount and the variable control amount are calculated; a post-correction basic control amount, which is nearer to the first target control amount than the basic control amount, is calculated; and the final target control amount is set to the total of the post-correction basic control amount and the variable control amount.

According to the above-described configuration, a post-correction basic control amount is nearer to the first target control amount than the basic control amount. Accordingly, as compared with the case where the final target control amount is the total of a target control amount for attitude control and a target control amount for riding comfort control, the possibility can be reduced that a requirement of control amount may become too large, and riding comfort of a vehicle can more reliably be enhanced.

According to the above-described configuration, the final target control amount is calculated so that it reflects on the variable control amount of the second target control amount. Accordingly, as compared with the case where the final target control amount is the higher one of a target control amount for attitude control and a target control amount for riding comfort control, riding comfort of a vehicle can more reliably be enhanced.

The present invention also provides a damping force control device for a vehicle which calculates a final target control amount that is based on a first target control amount for suppressing changes in the vehicle body attitude in at least the rolling direction, and a second target control amount for increasing riding comfort with regards to vehicle body vibrations in at least the rolling direction, for each damping force generation device installed between a vehicle wheel and a vehicle body, and controls the damping coefficient of each damping force generation device in accordance with the final target control amount, wherein the second target control amount is a control amount which is to be calculated as the total of a fixed basic control amount and a variable control amount; the first target control amount and the variable control amount are calculated; and the final target control amount is set to the total of the first target control amount and the variable control amount.

According to the above-described configuration, the basic control amount of the second target control amount for increasing riding comfort is replaced by the first target control amount. Accordingly, the possibility can more effectively be reduced that a requirement of control amount may become too large, so that the possibility can more reliably be reduced that riding comfort of a vehicle is deteriorated.

Again in the above-described configuration, the final target control amount is calculated so that it reflects on the variable control amount of the second target control amount. Accordingly, as compared with the case where the final target control amount is the higher one of a target control amount for attitude control and a target control amount for riding comfort control, riding comfort of a vehicle can more reliably be enhanced.

The above-mentioned configuration may be such that the first target control amount is calculated as a control amount for suppressing changes in the vehicle body attitude in a low frequency range and the variable control amount is calculated as a control amount for increasing riding comfort with regards to vehicle body vibrations in a frequency range higher than the low frequency range.

According to this configuration, the possibility can be reduced that the frequency ranges of the first and second control amounts are overlapped. Accordingly, the possibility can more reliably be reduced that a requirement of control amount may become too large, so that the possibility can more reliably be reduced that riding comfort of a vehicle is deteriorated.

The above-mentioned configuration may be such that the variable control amount is calculated as a control amount for increasing riding comfort with regards to vehicle body vibrations in the heave, pitching and rolling directions.

According to this configuration, a control amount for increasing riding comfort control can be calculated for principal modes of vibrations of vehicle body.

The above-mentioned configuration may be such that the first target control amount, the second target control amount and the final target control amount are target control amounts of damping coefficient.

According to this configuration, the first target control amount, the second target control amount and the final target control amount can be calculated with regard to damping coefficient of each damping force generation device.

The above-mentioned configuration may be such that the variable control amount is calculated according to a non-linear H∞ control theory.

According to this configuration, the variable control amount of the second control amount for increasing riding comfort can be calculated according to a non-linear H∞ control theory.

The above-mentioned configuration may be such that the first control amount is calculated as a control amount for suppressing changes in the vehicle body attitude in the pitching and rolling directions.

The above-mentioned configuration may be such that a target damping force for suppressing changes in the vehicle body attitude is calculated for each damping force generation device, and the first target control amount is calculated as a control amount for suppressing changes in the vehicle body attitude in a low frequency range by means of low-pass filtering of the target damping force.

The above-mentioned configuration may be such that a target damping force for suppressing changes in the vehicle body attitude is calculated based on vehicle acceleration for each damping force generation device, and the first target control amount is calculated as a control amount for suppressing changes in the vehicle body attitude in a low frequency range by means of low-pass filtering of the vehicle acceleration.

The above-mentioned configuration may be such that a target damping force for increasing riding comfort is calculated based on the vertical accelerations of sprung and unsprung members or state quantities equivalent thereto for each damping force generation device, and the variable control amount is calculated as a control amount for increasing riding comfort with regards to vehicle body vibrations in a frequency range higher than the low frequency range by means of high-pass filtering of the target damping force.

The above-mentioned configuration may be such that a target damping force for increasing riding comfort is calculated based on the vertical accelerations of sprung and unsprung members or state quantities equivalent thereto for each damping force generation device, and the variable control amount is calculated as a control amount for increasing riding comfort with regards to vehicle body vibrations in a frequency range higher than the low frequency range by means of high-pass filtering of the vertical accelerations of sprung and unsprung members or the state quantities equivalent thereto.

The above-mentioned configuration may be such that for each damping force generation device, a first target damping force for suppressing changes in the vehicle body attitude at least in the rolling direction is calculated; a first target damping coefficient is calculated based on the first target damping force; a variable damping force for increasing riding comfort with regards to vehicle body vibrations at least in the rolling direction is calculated; a target variable damping coefficient is calculated based on the variable damping force; and a final target damping coefficient is calculated based on the first target damping coefficient and the target variable damping coefficient.

The above-mentioned configuration may be such that a post-correction basic control amount is calculated as the total of the basic control amount and a correction amount which is derived by multiplying a correction coefficient that is larger than 0 and smaller than 1 and the difference between the basic control amount and the first target control amount.

The above-mentioned configuration may be such that the correction coefficient is variably set by a vehicle occupant.

BEST MODE FOR CARRYING OUT THE INVENTION

The present invention will now be described in detail with respect to preferred embodiments by referring to the accompanying drawings.

First Embodiment

Figure 1:
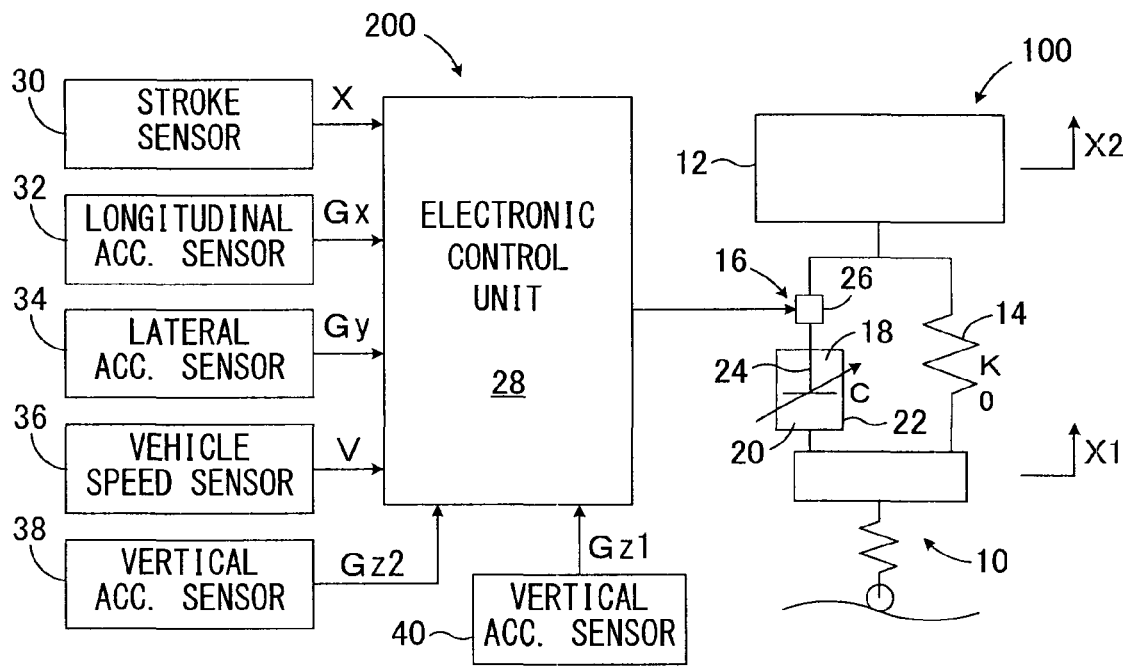
FIG. 1 is a schematic diagram showing a first embodiment of a damping force control device for a vehicle according to the present invention with respect to a single vehicle wheel.

FIG. 1 is a schematic diagram showing a first embodiment of a damping force control device for a vehicle according to the present invention with respect to a single vehicle wheel.

In FIG. 1, 10 designates a vehicle wheel which constitutes a major part of an unsprung portion of a vehicle 100, 12 designates a vehicle body which constitutes a major part of a sprung portion, and 200 designates an entire damping force control device. A suspension spring 14 and a damping force variable shock absorber 16 are provided in parallel with each other between a vehicle wheel carrier which rotatably supports the vehicle wheel 10 or a suspension arm and the vehicle body 12. The shock absorber 16 functions as a damping force generation device and the damping force control device 200 controls the damping coefficient of the shock absorber 16 so as to control the damping force generated by the shock absorber. It is to be noted that the vehicle 100 has four vehicle wheels, i.e. right and left front vehicle wheels and right and left rear vehicle wheels, and the suspension spring 14 and the shock absorber 16 are provided corresponding to each vehicle wheel.

The shock absorber 16 has a cylinder 22 and a piston 24 which cooperate with each other to define an upper cylinder chamber 18 and a lower cylinder chamber 20, the volumes of which are variable. The upper cylinder chamber 18 and the lower cylinder chamber 20 are filled with a viscous liquid such as oil or the like. In the illustrated embodiment, the shock absorber 16 is coupled to the vehicle wheel carrier or suspension arm at the lower end of the cylinder 22 and is coupled to the vehicle body 12 at the upper end of the rod portion of the piston 24.

As shown in FIG. 1, the piston 24 has therein damping force control valves for stretching and compression strokes which increase and decrease the effective sectional areas of passages communicating the upper cylinder chamber 18 and the lower cylinder chamber 20 with each other. These damping force control valves are controlled by an actuator 26 incorporated in the piston 24 and the actuator 26 is in turn controlled by an electronic control unit 28 as described in detail hereinafter. Accordingly, the damping force control valves of the shock absorber 16 are controlled by the actuator 26 so as to variably control the damping coefficients to thereby variably control the damping forces.

The electronic control unit 28 controls the openings of the damping force control valves for stretching and compression strokes in a stepped manner by way of the actuator 26 in such a sequence of left front, right front, left rear, right rear vehicle wheels. With a relative velocity of the piston 24 relative to the cylinder 22 being referred to stroke velocity Xd, a damping coefficient C is a ratio of damping force F relative to stroke velocity Xd. The electronic control unit 28 controls the control steps S of the shock absorber 16 in n (a positive number) steps, as shown in FIG. 2, raging from a control step S1 (soft) where the damping coefficient C is set to a minimum value to a control step Sn (hard) where the damping coefficient C is set to a maximum value.

Figure 2:
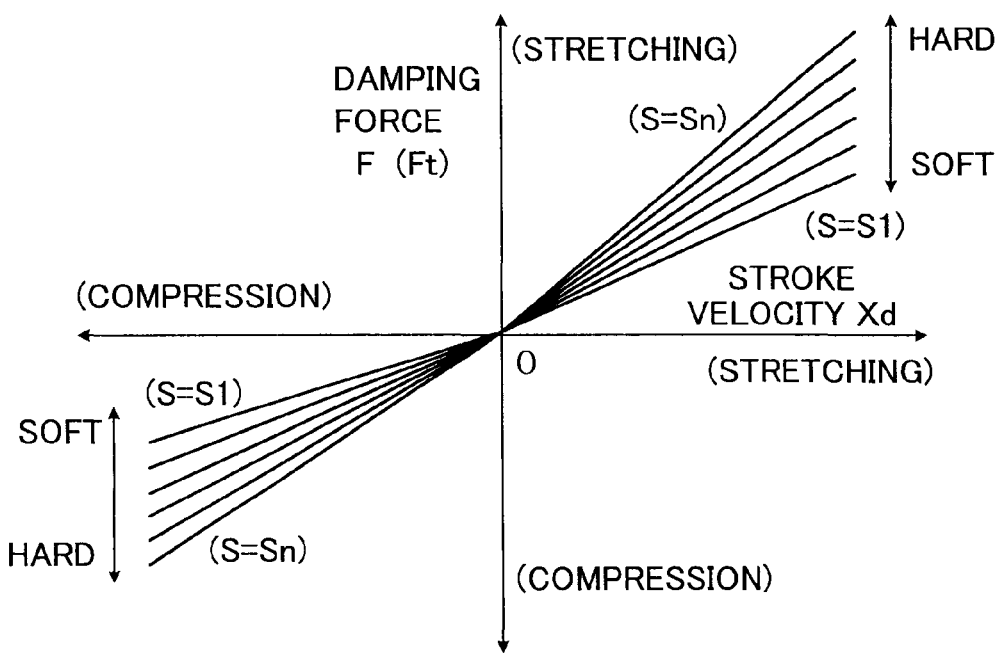
FIG. 2 is a graph showing the relationship among the control step Sn, stroke velocity Xd, and damping force F and target damping force Ft.

It is to be understood that the electronic control unit 28 has a storage that sores a map of the relationships among the control steps Sn, stroke velocity Xd and target damping force Ft which is the same relationships among the control steps Sn, stroke velocity Xd and damping force F shown in FIG. 2. The density of lines of the map may be higher than that of the shock absorber 16 and, accordingly, the number of lines of the map may be larger than the control steps Sn of the shock absorber 16.

The electronic control unit 28 is supplied with a signal from a stroke sensor 30 which indicates a suspension stroke, i.e. a vertical stroke X of the vehicle body 12 relative to the vehicle wheel 10 (the vertical displacement X2 of the unspring portion shown in FIG. 1—the vertical displacement X1 of the sprung portion). The electronic control unit 28 is also supplied with signals indicative of a longitudinal acceleration Gx and a lateral acceleration Gy of the vehicle form a longitudinal acceleration sensor 32 and a lateral acceleration sensor 34, respectively. The electronic control unit 28 is further supplied with a signal indicative of vehicle speed V from a vehicle speed sensor 36 and signals indicative of a vertical acceleration Gz2 of the sprung portion and a vertical acceleration Gz1 of the unsprung portion from vertical acceleration sensors 38 and 40, respectively.

The stroke sensor 30 detects the vertical stroke X which assumes 0 when the vehicle wheel 10 is at a neutral position having neither bound nor rebound stroke, and assumes positive and negative values when the stroke is bound and rebound strokes, respectively. The longitudinal acceleration sensor 32 detects a longitudinal acceleration Gx as a positive value when the vehicle is under acceleration and a lateral acceleration sensor 34 detects a lateral acceleration Gy as a positive value when the vehicle is under left turning. The vertical acceleration sensors 38 and 40 detect vertical accelerations Gz2 and Gz1, respectively, which assume positive values when the accelerations are upward.

It is to be noted that the electronic control unit 28 may actually be a micro-computer of well-known configuration having a CPU, a ROM, a RAM, input/output ports, etc. which are connected with one another by bi-directional common bus.

It is as well to be noted that the above-mentioned configuration described with respect to the damping force control device 200 is the same in the other embodiments described later.

In the first embodiment, the electronic control unit 28 calculates a target damping coefficient Cat for suppressing changes in the vehicle body attitude for each shock absorber on the basis of a longitudinal acceleration Gx and a lateral acceleration Gy. The electronic control unit 28 also calculates a target non-linear damping coefficient ΔCvt for enhancing riding comfort of the vehicle according to a non-linear H∞ control theory. Further more, the electronic control unit 28 adds the target damping coefficient Cat and the target non-linear damping coefficient ΔCvt to calculate a final target damping coefficient Ct, and controls each shock absorber 16 so that the damping coefficient C conforms to the associated target damping coefficient Ct.

Figure 3:
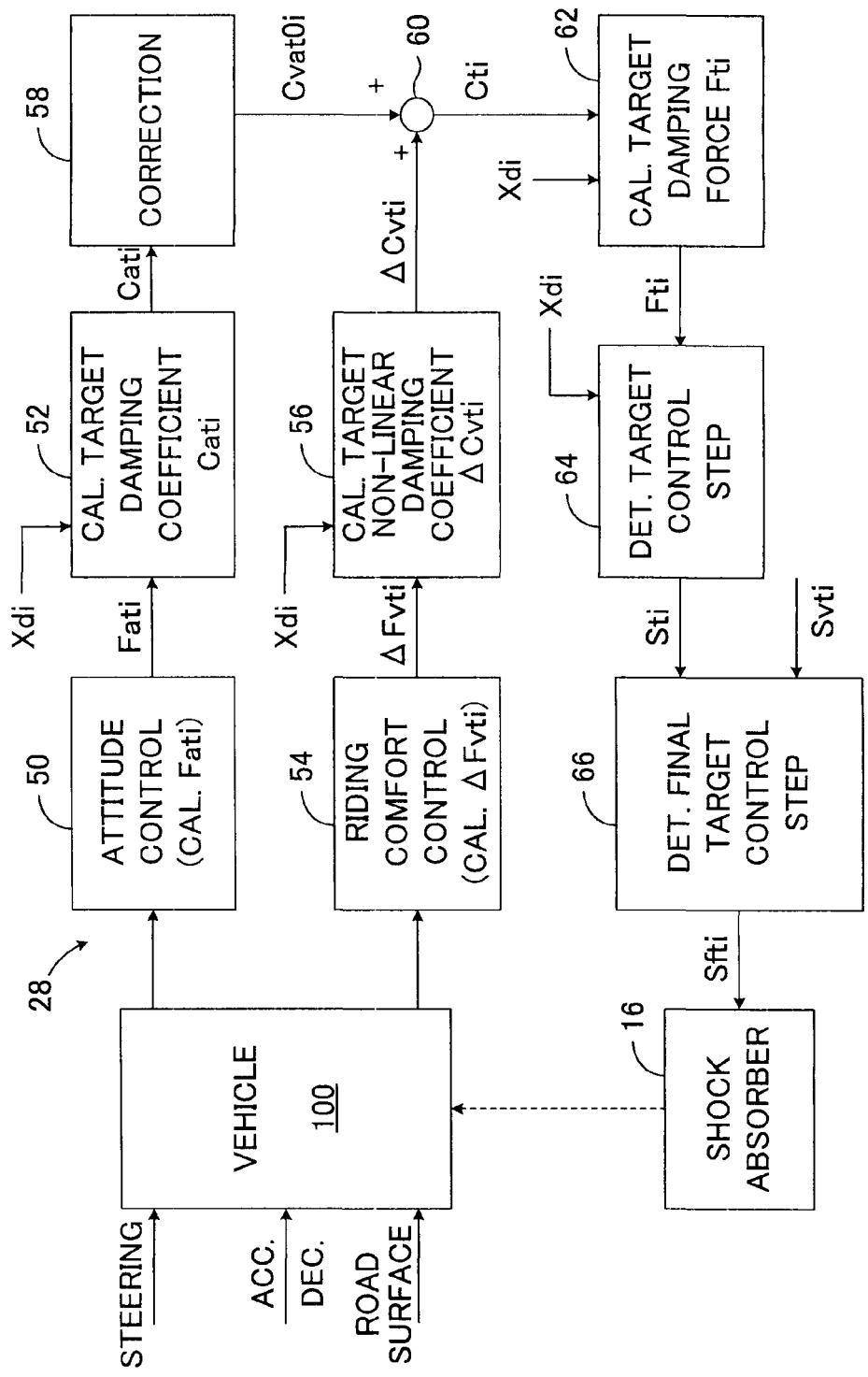
FIG. 3 is a block diagram showing damping force control in the first embodiment of a damping force control device for a vehicle according to the present invention.

Next, referring to the block diagram shown in FIG. 3, the damping force control in the first embodiment will be further described in detail.

As acceleration-deceleration operation or steering operation is conducted by a driver, longitudinal or lateral force acts on the vehicle 100, and longitudinal or lateral acceleration is generated. Accordingly, the vehicle body 12 of the vehicle 100 suffers attitude change in the pitching or rolling direction, i.e. pitching or rolling motion. In addition, the force received by each vehicle wheel from a road surface varies as the vehicle 100 travels, which gives rise to the vibration of the vehicle body 12 of the vehicle 100 in the heave, pitching and rolling directions.

The electronic control unit 28 has a block 50 of target damping force calculation for attitude control, and the block 50 calculates a target damping force Fat for attitude control on the basis of the longitudinal acceleration Gx and the lateral acceleration Gy. For example, positive coefficients for longitudinal acceleration Gx and lateral acceleration Gy are represented by Kx and Ky, respectively, and the suffixes i which indicate left front, right front, left rear, right rear vehicle wheels are represented by fl, fr, rl and rr, respectively. The block 50 calculates target damping forces Fatfl-Fatrr for suppressing changes in the attitude of the vehicle body 12 according to the following formulas 1 to 4:

$$Fat_{fl} = -KxGx - KyGy \quad (1)$$

$$Fat_{fr} = -KxGx + KyGy \quad (2)$$

$$Fat_{rl} = KxGx - KyGy \quad (3)$$

$$Fat_{rr} = KxGx + KyGy \quad (4)$$

It is to be understood that in calculation of target damping forces Fatfl–Fatrr, change rates of longitudinal acceleration Gx and lateral acceleration Gy, steering velocity or braking-driving-force may be accounted for so as more effectively to suppress the changes in the attitude of the vehicle body 12.

The signals indicative of the target damping forces Fati (i=fl–rr) for attitude control are fed to a block 52 of target damping coefficient calculation for attitude control. The block 52 is also fed with signals indicative of stroke velocities Xdi that are differential values of suspension strokes Xi of the vehicle wheels. The block 52 calculates target damping coefficients Cati for suppressing the changes in the attitude of the vehicle body 12 from a map corresponding to the graph shown in FIG. 2 on the basis of the target damping forces Fati and the stroke velocities Xdi.

Notably, the suspension stroke velocities Xdi of the vehicle wheels may be calculated as a difference between the integrated values of a vertical acceleration Gz2 of the sprung portion and a vertical acceleration Gz1 of the unsprung portion, i.e. a difference between the vertical velocities of the sprung and unsprung portions.

The electronic control unit 28 has a block 54 of target damping force calculation for riding comfort control, and the block 54 calculates target non-linear damping forces ΔFvti for riding comfort control according to a non-linear H∞ control theory.

It is to be noted that riding comfort control according to a non-linear H∞ control theory may be any one which is able to calculate target damping forces for riding comfort control as the totals of target basic damping forces (target linear damping forces) and target variable damping forces (target non-linear damping forces). For example, target damping forces may be calculated according to a non-linear H∞ control theory on the basis of motion equations with respect to heave motions of the vehicle body at respective vehicle wheel positions, heave motion of the vehicle body at vehicle gravity center, pitching and rolling motions of the vehicle body about vehicle gravity center. Such an example of calculation of target damping forces is described in Japanese Laid-open publication No. 2006-44523.

It is as well to be noted that target non-linear damping forces ΔFvti for riding comfort control may be calculated according to a any control theory other than non-linear H∞ control theory as long as it enables to calculate target damping forces for riding comfort control as the totals of target basic damping forces and target variable damping forces. An example of such control theory is LQR (Linear-quadratic regulator) control theory.

The signals indicative of the target non-linear damping forces ΔFvti for riding comfort control is input to a block 56 of target damping coefficient calculation for riding comfort control, and the block 56 calculates target damping coefficients ΔCvti for enhancing riding comfort of the vehicle 100 from a map corresponding to the graph shown in FIG. 2 on the basis of the target non-linear damping forces ΔFvti and the stroke velocities Xdi.

The signals indicative of the target damping coefficients Cati for attitude control are input to a block 58 of target basic damping coefficient calculation which calculates post-correction linear damping coefficients Cvta0i on the basis of the target damping coefficients Cati for attitude control.

A target linear damping coefficient which corresponds to target basic damping force for riding comfort control calculated according to the non-linear H∞ control theory is represented by Cvt0 (constant and common to all the vehicle wheels), and the differences between the target damping coefficients Cati for attitude control and the target linear damping coefficient Cvt0 are represented by ΔCvt0i. In addition, a constant correction coefficient that is larger than 0 and is smaller than 1 is represented by Ka. Then, the block 58 of target basic damping coefficient calculation calculates post-correction target linear damping coefficients Cvta0i according to the following formula 5:

$$Cvta0i = Cvt0 + Ka\Delta Cvt0i \quad (5)$$

It is to be understood that although the target linear damping coefficient Cvt0 is common to all the vehicle wheels, the target linear damping coefficients of the left and right front vehicle wheels may be set to values which are different from those of the left and right rear vehicle wheels. In addition, the correction coefficient Ka may be increasingly and decreasingly varied in a rage which is larger than 0 and smaller than 1 by means of, for example, an operation unit provided in a cabin being operated by a vehicle occupant.

The signals indicative of the post-correction target linear damping coefficients Cvta0i and the target non-linear damping coefficients ΔCvti for riding comfort control are input to an adder 60. The adder 60 adds the post-correction target linear damping coefficients Cvta0i and the target non-linear damping coefficients ΔCvti to calculate final target damping coefficients Cti for the shock absorbers 16.

The signals indicative of the final target damping coefficients Cti are input to a block 62 of target damping force calculation and the block 62 is also supplied with signals indicative of the stroke velocities Xdi. The block 62 multiplies the target damping coefficients Cti and the associated stroke velocities Xdi to calculate final target damping forces Fti for the shock absorbers 16.

The signals indicative of the target damping forces Fti are input to a block 64 of target control step determination and the block 64 is also supplied with signals indicative of the stroke velocities Xdi. The block 64 determines control steps which are able to generate damping forces nearest to the final target damping forces Fti from a map corresponding to the graph shown in FIG. 2 on the basis of the final target damping forces Fti and the stroke velocities Xdi and sets the control steps to target control steps Sti.

The signals indicative of the target control steps Sti are input to a block 66 of final target control step determination and the block 66 is also supplied with signals indicative of vehicle speed sensitive target control steps Svti. The vehicle speed sensitive target control steps Svti are basic control steps which are variably set on the basis of vehicle speed V so that they are shifted toward hard as vehicle speed V increases. The block 66 determines the higher ones of the target control steps Sti and the vehicle speed sensitive target control steps Svti to set the determined steps to final target control steps Sfti. Notably, the relationships between vehicle speed V and vehicle speed sensitive target control steps Svti may be varied by means of, for example, a switch provided in a cabin being operated by a vehicle occupant.

The electronic control unit 28 controls the actuators 26 to control the associated damping force control valves so that the control steps of the shock absorbers 16 conform to the associated final target control steps Sfti.

Thus, according to the first embodiment, target damping forces Fati for attitude control are calculated on the basis of a longitudinal acceleration Gx and a lateral acceleration Gy, and target damping coefficients Cati for attitude control are calculated on the basis of target damping forces Fati and stroke velocities Xdi. Target non-linear damping forces ΔFvti for riding comfort control are calculated according to a non-linear H∞ control theory, and target non-linear damping coefficients ΔCvti for riding comfort control are calculated on the basis of target non-linear damping forces ΔFvti and stroke velocities Xdi.

Post-correction target linear damping coefficients Cvta0$i$ are calculated according to the formula 5, and the totals of the post-correction target linear damping coefficients Cvta0$i$ and the target non-linear damping coefficients ΔCvti for riding comfort control are calculated as final target damping coefficients Cti. Finally, target control steps Sti are determined on the basis of the final target damping coefficients Cti, and the higher ones of the target control steps Sti and the vehicle speed sensitive target control steps Svti are set to final target control steps Sfti.

Accordingly, the differences between the post-correction target linear damping coefficients Cvta0$i$ and the target damping coefficients Cati for attitude control are smaller that those between the pre-correction target linear damping coefficients Cvt0 and the target damping coefficients Cati for attitude control. In other words, the post-correction linear damping coefficients Cvta0$i$ are made closer to the target damping coefficients Cati for attitude control than the pre-correction target linear damping coefficients Cvt0.

Figure 7:
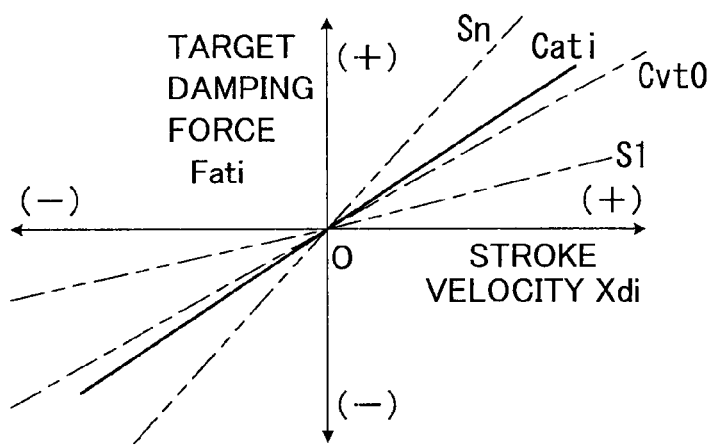
FIG. 7 is a graph showing an example of the relationship among the suspension stroke velocities Xdi, the target damping coefficients Cati for attitude control and the target damping forces Fati for attitude control.
Figure 8:
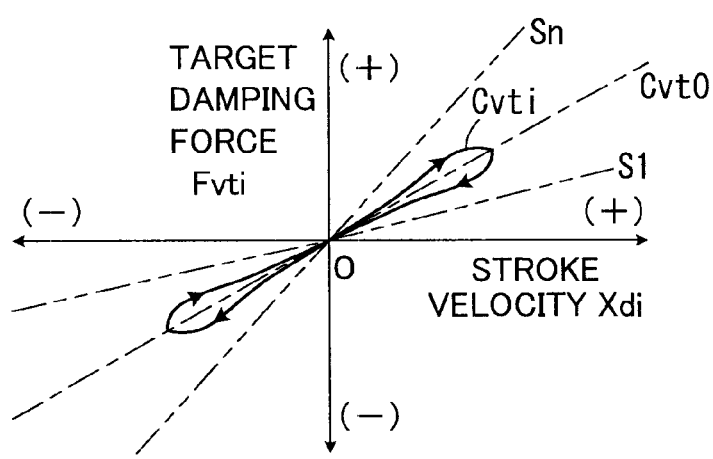
FIG. 8 is a graph showing an example of the relationship among the suspension stroke velocities Xdi, the target damping coefficients Cvti for riding comfort control according to non-linear H∞ control theory and the target damping forces Fvti for riding comfort control.

The target damping coefficients Cati for attitude control are assumed to be values shown in FIG. 7 and the target damping coefficients Cvti for riding comfort control according to a non-linear H∞ control theory are assumed to vary as shown in FIG. 8 as stroke velocities Xdi vary.

Figure 9:
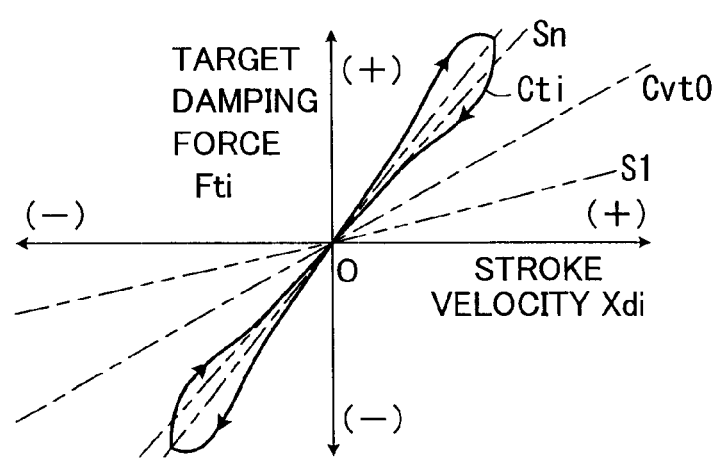
FIG. 9 is a graph showing an example of the relationship among the suspension stroke velocities Xdi, the final target damping coefficients Cti for attitude control and the target damping forces Fati with respect to the case where the final target damping coefficients Cti are calculated as the respective totals of the target damping coefficients Cati for attitude control and the target damping coefficients Cvti for riding comfort control.

FIG. 9 shows the case where the final target damping coefficients Cti are calculated to the totals of the target damping coefficients Cati for attitude control and the target damping coefficients Cvti for riding comfort control. In this case, target damping forces corresponding to the final target damping coefficients Cti may be too large and may depart from the rage of damping force which each shock absorber 16 can generate.

Figure 10:
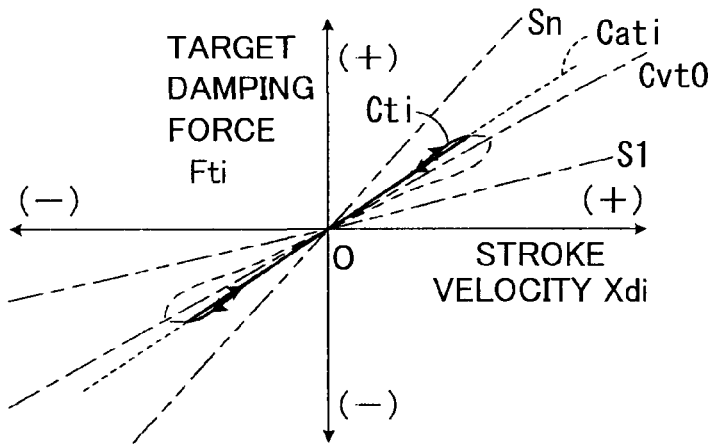
FIG. 10 is a graph showing an example of the relationship among the suspension stroke velocities Xdi, the final target damping coefficients Cti for attitude control and the target damping forces Fati with respect to the case where the final target damping coefficients Cti are calculated to the respective larger ones of the target damping coefficients Cati for attitude control and the target damping coefficients Cvti for riding comfort control.

FIG. 10 shows the case where the final target damping coefficients Cti are calculated to the larger ones of the target damping coefficients Cati for attitude control and the target damping coefficients Cvti for riding comfort control. In this case, a divergence grows in accordance with the variation of stroke velocities Xdi between the variation of the final target damping coefficients Cti and the target damping coefficients Cvti for riding comfort control, which makes it unable to reliably enhance the riding comfort of the vehicle.

Figure 11:
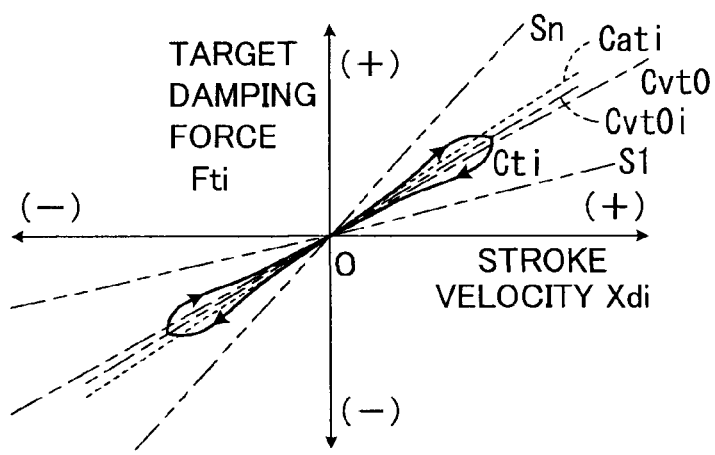
FIG. 11 is a graph showing the relationship among the suspension stroke velocities Xdi, the final target damping coefficients Cti and the target damping forces Fti with respect to the first embodiment.

To the contrary, according to the first embodiment, the final target damping coefficients Cti are values shown in FIG. 11. Accordingly, the possibility can be reduced that target damping forces corresponding to the final target damping coefficients Cti depart from the rage of damping force which each shock absorber 16 can generate. It is possible to reduce a divergence generated in accordance with the variation of stroke velocities Xdi between the variation of the final target damping coefficients Cti and the target damping coefficients Cvti for riding comfort control, so that the riding comfort of the vehicle can be reliably enhanced.

Second Embodiment

Figure 4:
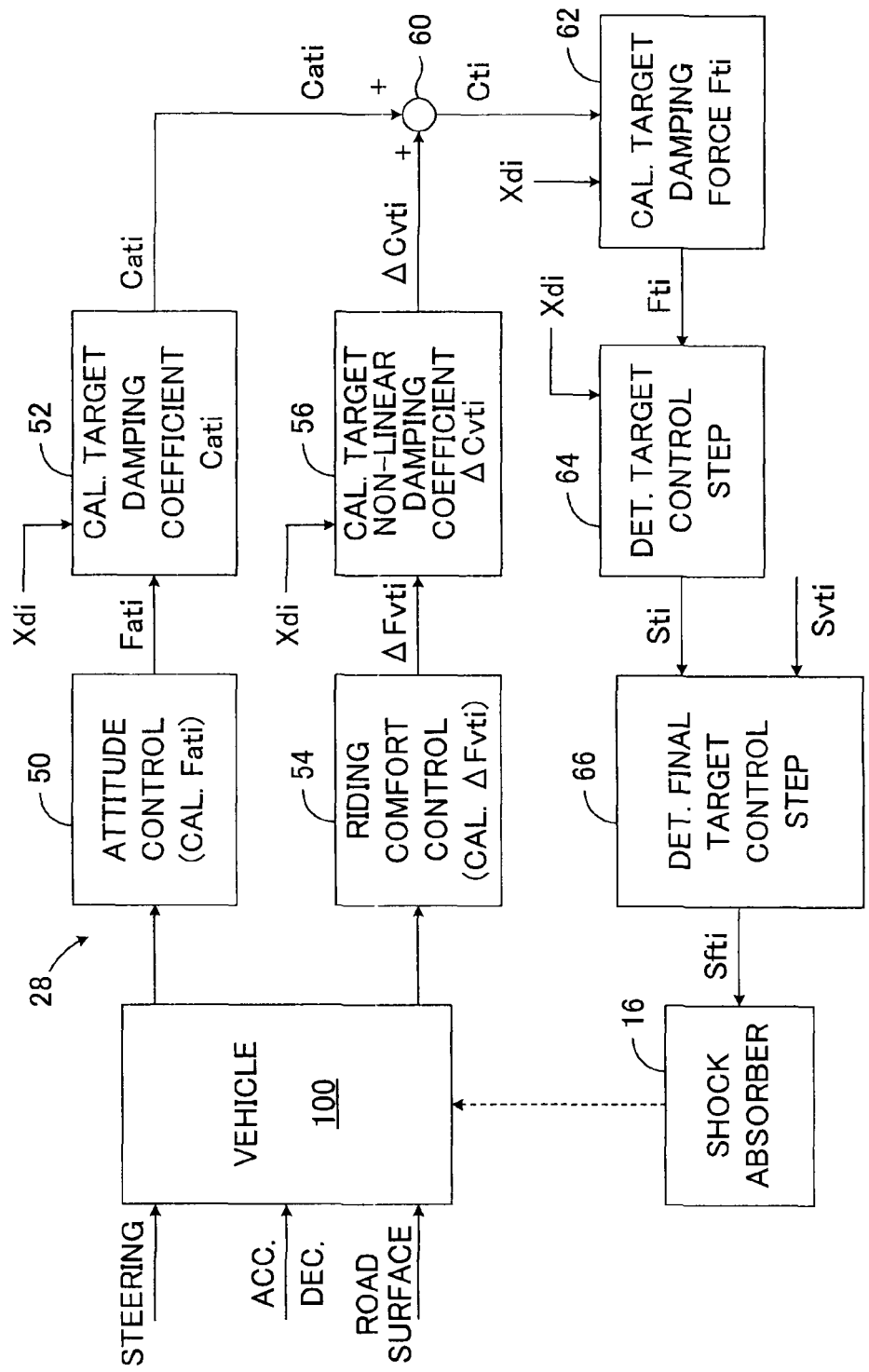
FIG. 4 is a block diagram showing damping force control in a second embodiment of a damping force control device for a vehicle according to the present invention.

FIG. 4 is a block diagram showing damping force control in a second embodiment of a damping force control device for a vehicle according to the present invention.

As illustrated in FIG. 4, in this embodiment, the electronic control unit 28 does not have the block 58 of target basic damping coefficient calculation. The signals indicative of target damping coefficients Cati for attitude control calculated by the block 52 of target damping coefficient calculation for attitude control are directly input to the adder 60. Accordingly, the adder 60 adds the target damping coefficients Cati for attitude control and the target non-linear damping coefficients ΔCvti for riding comfort control to calculate final target damping coefficients Cti for the shock absorbers 16.

As is understood by comparing FIG. 4 with FIG. 3, the other calculations in the second embodiment are conducted in the same manners as in the above-described first embodiment.

According to the second embodiment, the final target damping coefficients Cti for the shock absorbers 16 are the totals of the target damping coefficients Cati for attitude control and the target non-linear damping coefficients ΔCvti for riding comfort control. In other words, the target linear damping coefficients Cvt0 for riding comfort control calculated according to a non-linear H∞ control theory are replaced by the target damping coefficients Cati for attitude control.

Figure 12:
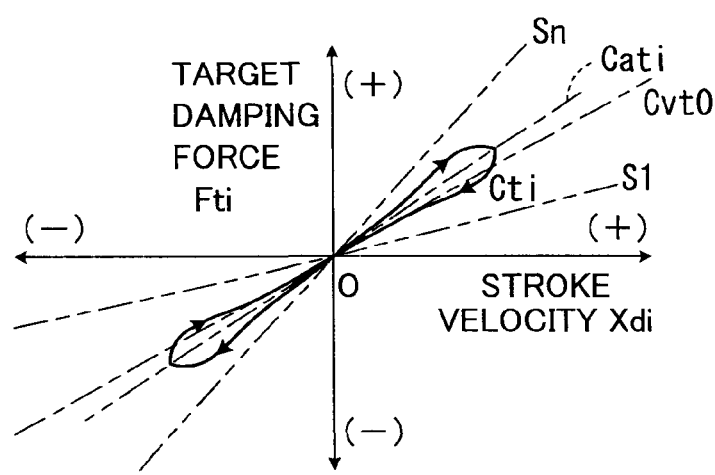
FIG. 12 is a graph showing the relationship among the suspension stroke velocities Xdi, the final target damping coefficients Cti and the target damping forces Fti with respect to the second embodiment.

Therefore, according to the second embodiment, under the situation where the target damping coefficients Cati for attitude control and the target damping coefficients Cvti vary as shown in FIGS. 7 and 8, respectively, the final target damping coefficients Cti vary as shown in FIG. 12. Accordingly, the possibility can be reduced more reliably than in the first embodiment that target damping forces corresponding to the final target damping coefficients Cti depart from the rage of damping force which each shock absorber 16 can generate.

It is to be understood that again in the second embodiment, the riding comfort of the vehicle can reliably be enhanced as compared with the case where the final target damping coefficients Cti are calculated to the larger ones of the target damping coefficients Cati for attitude control and the target damping coefficients Cvti for riding comfort control.

Third Embodiment

Figure 5:
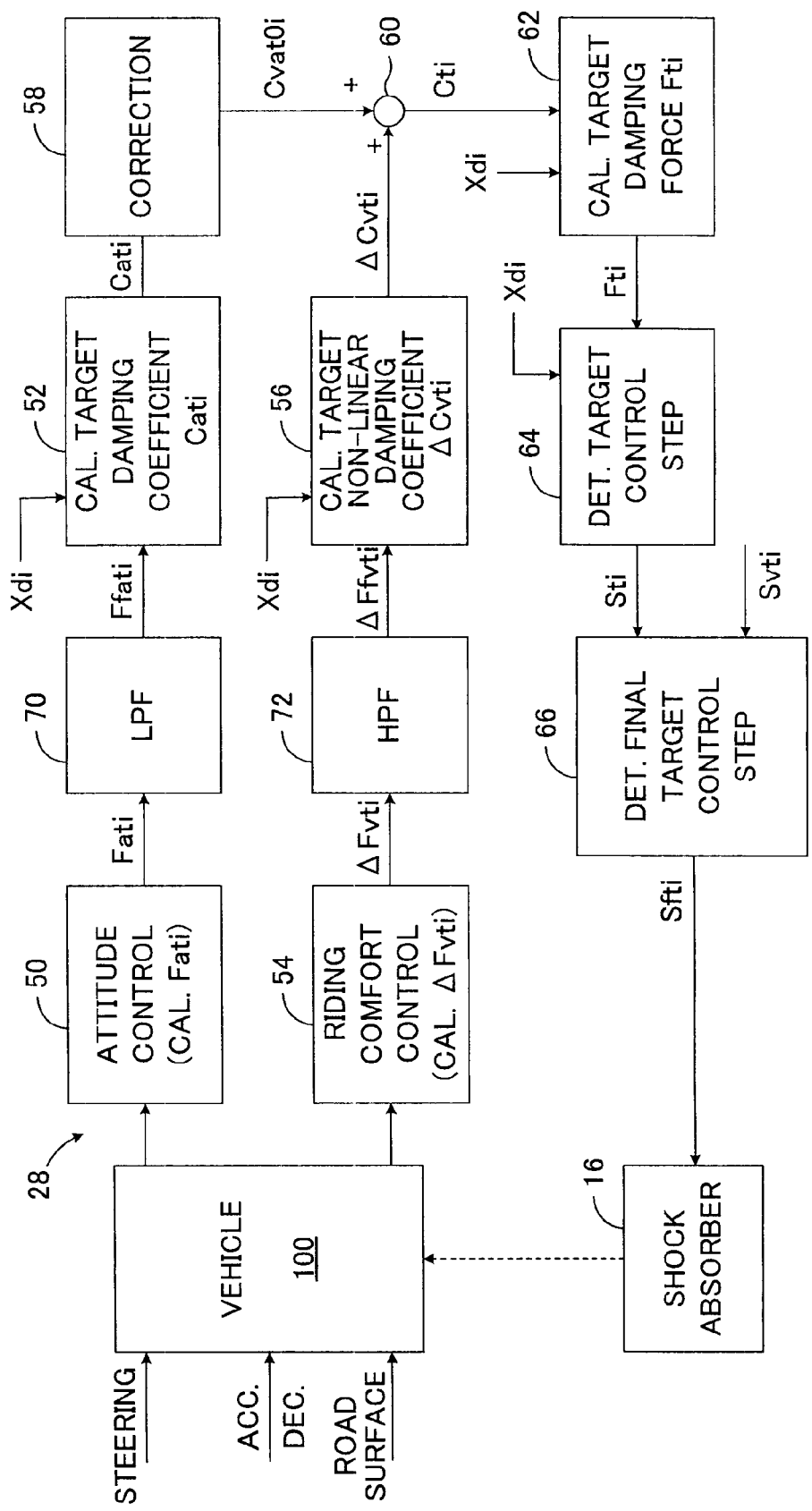
FIG. 5 is a block diagram showing damping force control in a third embodiment of a damping force control device for a vehicle according to the present invention.

FIG. 5 is a block diagram showing damping force control in a third embodiment of a damping force control device for a vehicle according to the present invention.

As illustrated in FIG. 5, the signals indicative of the target damping forces Fati for attitude control are input to a block 70 of low-pass filtering process. The block 70 conducts low-pass filtering process on the signals indicative of the target damping forces Fati with a preset cut-off frequency fcl to calculate low-pass filtered target damping forces Ffati for attitude control.

The signals indicative of the low-pass filtered target damping forces Ffati for attitude control are input to the block 52 of target damping coefficient calculation for attitude control. The block 52 calculates target damping coefficients Cati for suppressing the changes in the attitude of the vehicle body 12 from a map corresponding to the graph shown in FIG. 2 on the basis of the target damping forces Ffati and the stroke velocities Xdi.

As illustrated in FIG. 5, the signals indicative of the target non-linear damping forces ΔFvti for riding comfort control are input to a block 72 of high-pass filtering process. The block 70 conducts high-pass filtering process on the signals indicative of the target non-linear damping forces ΔFvti with a preset cut-off frequency fch to calculate high-pass filtered target non-linear damping forces ΔFfvti for riding comfort control.

Notably, although the cut-off frequency fch for high-pass filtering process may be equal to or smaller than the cut-off frequency fcl for low-pass filtering process, the former is preferably greater than the latter.

The signals indicative of the high-pass filtered target non-linear damping forces ΔFfvti for riding comfort control are input to the block 56 of target damping coefficient calculation for riding comfort control, and the block 56 calculates target non-linear damping coefficients ΔCvti for enhancing riding comfort of the vehicle 100 from a map corresponding to the graph shown in FIG. 2 on the basis of the target non-linear damping forces ΔFfvti and the stroke velocities Xdi.

As is understood by comparing FIG. 5 with FIG. 3, the other controls in the third embodiment, i.e. the controls in the blocks 58-66 are conducted in the same manners as in the above-described first embodiment.

According to the third embodiment, low-pass filtered target damping forces Ffati for attitude control are calculated through the low-pass filtering process on the signals indicative of the target damping forces Fati for attitude control. The target damping coefficients Cati for attitude control are calculated on the basis of the low-pass filtered target damping forces Ffati.

High-pass filtered non-linear damping forces ΔFfvti for riding comfort control are calculated through the high-pass filtering process on the signals indicative of the target non-linear damping forces ΔFvti for riding comfort control. The target damping coefficients ΔCvti for riding comfort control are calculated on the basis of the high-pass filtered target non-linear damping forces ΔFfvt for riding comfort control.

Therefore, as compared with first embodiment where the above-described low-pass and high-pass filtering processes are not conducted, the possibility can more reliably be reduced that target damping forces corresponding to the final target damping coefficients Cti depart from the rage of damping force which each shock absorber 16 can generate.

Fourth Embodiment

Figure 6:
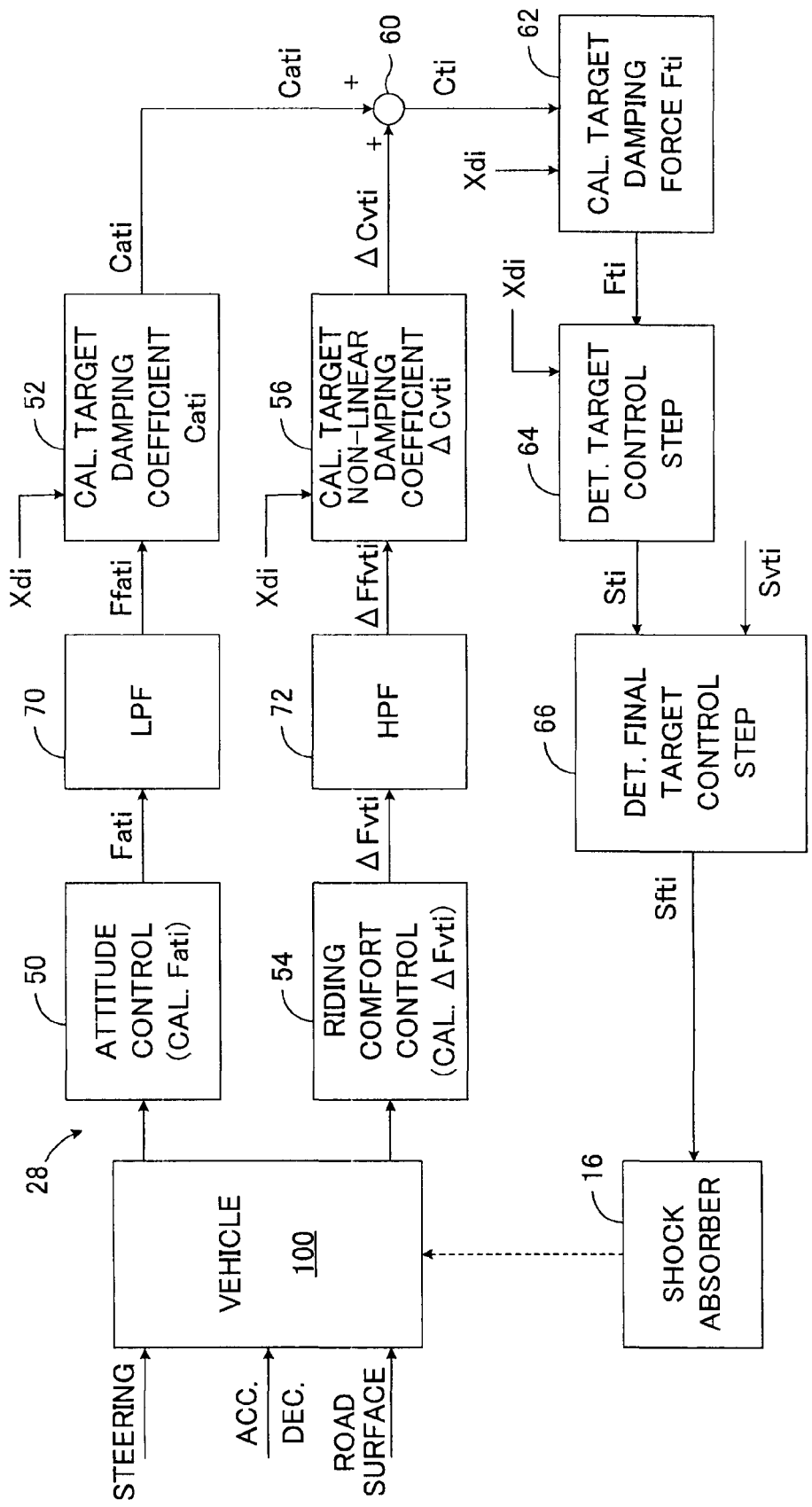
FIG. 6 is a block diagram showing damping force control in a fourth embodiment of a damping force control device for a vehicle according to the present invention.

FIG. 6 is a block diagram showing damping force control in a fourth embodiment of a damping force control device for a vehicle according to the present invention.

As illustrated in FIG. 6, in this embodiment, as in the second embodiment, the electronic control unit 28 does not have the block 58 of target basic damping coefficient calculation. Accordingly, the adder 60 adds the target damping coefficients Cati for attitude control and the target non-linear damping coefficients ΔCvti for riding comfort control to calculate final target damping coefficients Cti for the shock absorbers 16.

As is understood by comparing FIG. 6 with FIG. 5, the other controls in the fourth embodiment are conducted in the same manners as in the above-described third embodiment.

According to the fourth embodiment, the same effects can be achieved as in the third embodiment. As in the second embodiment, the target linear damping coefficients Cvt0 for riding comfort control calculated according to a non-linear H∞ control theory are replaced by the target damping coefficients Cati for attitude control. Therefore, the possibility can be reduced more reliably than in the first through third embodiments that target damping forces corresponding to the final target damping coefficients Cti depart from the rage of damping force which each shock absorber 16 can generate.

It is to be understood that in the third and fourth embodiments, when the cut-off frequency fch for high-pass filtering process is higher than the cut-off frequency fcl for low-pass filtering process, the possibility that target damping forces depart from the rage of damping force which can be generated can be reduced more reliably than in the case where fch is equal to or smaller than fcl.

In the first and third embodiments, as the correction coefficient Ka is made closer to 1, the post-correction linear damping coefficients Cvta0$i$ becomes closer to the target damping coefficients Cati for attitude control. Therefore, when the correction coefficient Ka can be increasingly and decreasingly varied by a vehicle occupant, the effect of attitude control can be enhanced by setting the correction coefficient Ka to a value closer to 1 and, conversely, the effect of riding comfort control can be enhanced by setting the correction coefficient Ka to a value closer to 0.

While the present invention has been described with reference to the above embodiments, it will be apparent to those skilled in the art that the present invention is not limited thereto, but may be embodied in various other forms without departing from the scope of the invention.

For example, while in the above-described embodiments, the damping force generating device is the shock absorber 16 of cylinder-piston type, it may be of any configuration as long as it can generates variable damping force which damps relative vibration between sprung and unsprung members. An example of the damping force generating device is a rotary damper of damping coefficient variable type. The damping force generating device may be a device which can vary damping coefficient steplessly, i.e. continuously.

In the above-described embodiments, the higher ones of the target control steps Sti and the vehicle speed sensitive target control steps Svti are set to final target control steps Sfti. However, vehicle speed sensitive target control steps Svti may be omitted. In that case, a map for calculating target damping forces Fati for attitude control is preferably set for each vehicle speed range, and calculation parameters for riding comfort control are preferably set to different values for each vehicle speed range.

In the above-described third and fourth embodiments, a low-pass filtering process is conducted on the signals indicative of the target damping forces Fati for attitude control. However, a longitudinal acceleration Gx and a lateral acceleration Gy of a vehicle for calculating target damping forces Fati for attitude control may be low-pass filtered.

In similar, in the above-described third and fourth embodiments, a high-pass filtering process is conducted on the signals indicative of the target non-linear damping forces ΔFvti for riding comfort control. However, parameters for calculating target non-linear damping forces ΔFvti for riding comfort control may be high-pass filtered.

The invention claimed is:

1. A damping force control device for a vehicle which calculates a final target damping coefficient that is based on a first target damping coefficient for suppressing changes in the vehicle body attitude in at least the rolling direction, and a second target damping coefficient for increasing riding comfort with regards to vehicle body vibrations in at least the rolling direction, for each damping force generation device installed between a vehicle wheel and a vehicle body, and controls the damping coefficient of each damping force generation device in accordance with said final target damping coefficient, wherein said second target damping coefficient is a target damping coefficient which is to be calculated as the total of a fixed target linear damping coefficient that is derived based on a target basic damping force for increasing rider comfort and a target non-linear damping coefficient that is derived based on a target variable damping force for increasing rider comfort;

said first target damping coefficient and said target non-linear damping coefficient of said second of said second target damping coefficient are calculated; and said final target damping coefficient is set to the total of said first target damping coefficient and said target non-linear damping coefficient.

2. A damping force control device for a vehicle according to claim 1, wherein said first target damping coefficient is calculated as a target damping coefficient for suppressing changes in the vehicle body attitude in low frequency range and said target non-linear damping coefficient is calculated as a target damping coefficient for increasing riding comfort with regards to vehicle body vibrations in a frequency range higher than said low frequency range.

3. A damping force control device for a vehicle according to claim 1, wherein said target non-linear damping coefficient is calculated as a target damping coefficient for increasing riding comfort with regards to vehicle body vibrations in the heave, pitching and rolling directions.

4. A damping force control device for a vehicle according to claim 1, wherein said target non-linear damping coefficient is calculated according to a non-linear $H\infty$ control theory.

* * * * *